United States Patent Office 3,118,955
Patented Jan. 21, 1964

---

3,118,955
STABLE SOLVENT COMPOSITIONS CONTAINING TRIISOPROPANOLAMINE BORATE
David M. Young, Sarnia, Ontario, Canada, assignor to The Dow Chemical Company, Midland, Mich., a corporation of Delaware
No Drawing. Filed Oct. 25, 1961, Ser. No. 147,491
5 Claims. (Cl. 260—652.5)

This invention relates to stable chlorinated aliphatic hydrocarbon solvent compositions and to a method for preparing such compositions.

It is well known that chlorinated aliphatic hydrocarbon solvents, particularly perchloroethylene and trichloroethylene, undergo appreciable decomposition when subjected for even short periods of time to elevated temperatures, contact with oxygen, and exposure to natural daylight or sunlight or to artificial light.

As a result of such decomposition, the solvents gradually darken in color and have corrosive effects on many metals with which they come into contact, particularly iron, copper, aluminum and zinc. The darkening in color and corrosive action of the partly decomposed solvents thus impairs their utility in various application, such as dry-cleaning and metal degreasing.

Although the decomposition products of the solvents are several, hydrochloric acid has been found to be the most damaging because of its highly corrosive action on various metals. Other identified decomposition products include carbon monoxide, phosgene, and acyl chlorides.

However, it has now been found that chlorinated aliphatic hydrocarbon solvents are effectively stabilized against decomposition, and novel essentially stable compositions are thereby produced, by incorporating into said solvents a small amount, sufficient to effect stabilization, of triisopropanolamine borate ester having the formula:

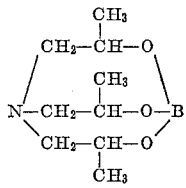

The preferred concentration of said borate in the solvent is from about 0.05 percent to about 1 percent by weight, although amounts less than 0.05 percent will have some inhibiting effect. A concentration significantly greater than 1 percent by weight offers no great increase in inhibition of the decomposition of the solvent and increases the inhibitor cost correspondingly.

The present invention is particularly applicable to perchloroethylene, trichloroethylene, and methyl chloroform (1,1,1-trichloroethane).

The extent and the rate of decomposition of a chlorinated aliphatic hydrocarbon solvent can be ascertained by knowing the extent and rate of hydrochloric acid formation in the solvent. Accordingly, the determination of HCl concentration, such as for example by titration with standard sodium hydroxide, is thus a simple and reliable method for following the decomposition of the solvent.

The practice of the present invention is illustrated by the following example.

200 ml. of trichloroethylene were added to each of two 500 ml. Erlenmeyer flasks equipped with 24/40 ground glass joints. To one flask 0.25 percent by weight, based on the trichloroethylene, of triisopropanolamine borate was added, the other trichloroethylene sample serving as a control. Each flask was placed directly above a standard 150 watt frosted light bulb and fitted with a water-cooled condenser. Oxygen tubes were positioned inside the condenser and having their lower ends below the surface of the trichloroethylene. The oxygen flow was adjusted to 12–15 bubbles per minute, the samples were heated to reflux temperature and maintained thereat for 48 hours. The samples were then removed, cooled to room temperature, and each was titrated with standard sodium hydroxide to determine the acidity present, which was calculated as percent hydrochloric acid. There are shown in Table I the concentrations of HCl determined in the treated and untreated samples.

Table I

| Sample | Acidity after Oxidation Test, Weight Percent HCl |
|---|---|
| Untreated trichloroethylene | 0.34 |
| Trichloroethylene and 0.25 percent triisopropanolamine borate | 0.05 |

I claim:
1. A composition comprising a chlorinated aliphatic hydrocarbon solvent and an amount, sufficient to improve the stability of said solvent, of triisopropanolamine borate.
2. A composition as in claim 1 wherein the chlorinated aliphatic hydrocarbon solvent is selected from the group consisting of perchloroethylene, trichloroethylene, and 1,1,1-trichloroethane.
3. A composition as in claim 1 wherein the triisopropanolamine borate is present in a concentration of from about 0.05 percent to about 1 percent by weight.
4. A composition as in claim 1 wherein the solvent is trichloroethylene.
5. A method for stabilizing chlorinated aliphatic hydrocarbon solvents comprising adding to said solvent an amount, sufficient to effect stabilization, of triisopropanolamine borate.

References Cited in the file of this patent
UNITED STATES PATENTS
2,959,623    Pray et al. _____ Nov. 8, 1960
OTHER REFERENCES
Bennett: Concise Chemical and Technical Dictionary, Chem. Pub. Co., New York (1962), page 781.